United States Patent
Harpaz et al.

(10) Patent No.: US 8,149,830 B2
(45) Date of Patent: Apr. 3, 2012

(54) EFFICIENT LIGHT-WEIGHT MULTICASTING COMMUNICATION PROTOCOL

(75) Inventors: Avraham Harpaz, Haifa (IL); Nir Naaman, Haifa (IL); Idan Zach, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 12/235,626

(22) Filed: Sep. 23, 2008

(65) Prior Publication Data

US 2010/0074255 A1   Mar. 25, 2010

(51) Int. Cl.
- H04L 12/56 (2006.01)
- H04L 12/28 (2006.01)
- G08C 25/02 (2006.01)
- H04L 1/14 (2006.01)

(52) U.S. Cl. .......... 370/390; 370/432; 714/748
(58) Field of Classification Search .......... None
See application file for complete search history.

(56) References Cited

U.S. PATENT DOCUMENTS

| | | | |
|---|---|---|---|
| 2006/0174020 A1* | 8/2006 | Walls et al. | 709/230 |
| 2007/0064718 A1* | 3/2007 | Ekl et al. | 370/432 |
| 2007/0115823 A1* | 5/2007 | Shen | 370/235 |
| 2008/0009320 A1* | 1/2008 | Rikkinen et al. | 455/560 |
| 2008/0031244 A1* | 2/2008 | Tran et al. | 370/390 |
| 2009/0232041 A1* | 9/2009 | Smith | 370/312 |

OTHER PUBLICATIONS

K. Obraczka, "Multicast transport mechanisms: A survey and taxonomy," IEEE Communication Magazine, pp. 94-102, Jan. 1998.

M. Chereque, D. Powell, P. Reynier, J.L. Richier, J. Voiron, "Active replication in Delta-4", Twenty-Second International Symposium on Fault-Tolerant Computing, 1992.

C. Engelmann, S.L.Scott, C. Leangsuksun, X.He, "Active/active replication for highly available HPC system services", The First International Conference on Availability, Reliability and Security, pp. 20-22, 2006.

S. Pingali, D. F. Towsley, and J. F. Kurose, "A comparison of sender-initiated and receiver-initiated reliable multicast protocols," IEEE Journal on Selected Areas in Communications, vol. 15, pp. 398-406, Apr. 1997.

* cited by examiner

*Primary Examiner* — Marcus R Smith
(74) *Attorney, Agent, or Firm* — Jason Far-Hadian

(57) ABSTRACT

A method for communication in a computing environment is provided. The method comprises transmitting a first data packet to one or more receiving units in a first set; receiving one or more acknowledgement messages (ACKs) from one or more receiving units in a second set, wherein the second set is a subset of the first set; removing the first data packet from a queue, in response to receiving at least one ACK from N receiving units within a time threshold; and re-transmitting the first data packet to the first set, in response to failing to receive at least one ACK from N receiving units within the time threshold.

18 Claims, 4 Drawing Sheets

EFFICIENT LIGHT-WEIGHT MULTICASTING COMMUNICATION PROTOCOL

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to communication in a computing environment and, more particularly, to an efficient multicasting communication protocol for transmitting data in a communication system.

BACKGROUND

In a computing environment, a computing system may communicate with one or more other computing systems by transmitting data to the other computing systems in data packets.

In an acknowledgement-based, or ACK-based communication protocol, a sender generates a packet, saves the packet in a history queue, and transmits the packet to one or more receivers. If the sender does not receive an ACK, or a message acknowledging successful transmission of the packet, from each of the receivers within a certain period of time, the sender re-transmits the packet to all the receivers. Upon receiving an ACK from all of the receivers, the sender removes the packet from the history queue.

Additionally, if a receiver fails or is otherwise prevented from receiving a packet, the sender cannot remove the packet from the history queue because the removal of the packet from the sender's history queue is contingent upon the sender determining that all the intended receivers acknowledge the receipt of the packet. Thus, if one from among many of the receivers cannot acknowledge receipt of a packet that packet remains in the history queue and is retransmitted. This phenomenon may lead to delays, unnecessary re-transmissions, large memory consumption, or lost packets.

Furthermore, there are potential scalability problems because each receiver must constantly send ACKs to the sender. Though existing modifications to the ACK protocol (e.g., ACK trees) may reduce the scalability problems, these modifications require additional resources and present configuration issues.

A negative acknowledgment-based, or NAK-based protocol, is more scalable and requires no configuration. Under a NAK-based protocol, a sender generates a packet, saves the packet in a history queue, and transmits the packet to one or more receivers. If the sender receives a NAK, or a message indicating that the packet has been lost (i.e., not correctly received) from a receiver, the sender re-transmits the packet to the receiver. The sender removes packets from the history queue according to a cleaning mechanism (e.g., based on memory consumption).

A NAK-based protocol, however, is less reliable than an ACK-based protocol because the sender may remove a packet from the history queue according to a cleaning mechanism before receiving a NAK from a receiver that has not received the packet. In such a case, a receiver that has not received the lost packet will never receive the lost packet as it is no longer stored in the sender's history queue and thus it cannot be retransmitted. Systems and methods are needed that can overcome the aforementioned shortcomings.

SUMMARY

The present disclosure is directed to systems, methods and corresponding products that facilitate communication in a computing environment.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for communication in a computing environment is provided. The method comprises transmitting a first data packet to one or more receiving units in a first set; receiving one or more acknowledgement messages (ACKs) from one or more receiving units in a second set, wherein the second set is a subset of the first set; removing the first data packet from a queue, in response to receiving at least one ACK from N receiving units within a time threshold; and re-transmitting the first data packet to the first set, in response to failing to receive at least one ACK from N receiving units within the time threshold.

In accordance with another embodiment, a method for communication in a computing environment is provided. The method comprises transmitting a first data packet to one or more receiving units in a first set and receiving one or more acknowledgement messages (ACKs) from one or more receiving units in a second set. The second set is a subset of the first set, and each ACK is assigned a weight. If one or more ACKS are received within a time threshold such that total weight of the ACKs is greater than a threshold weight, the first data packet is removed from a queue. Otherwise, the first data packet is re-transmitted to the first set.

In accordance with another embodiment, a system comprising one or more logic units is provided. The one or more logic units are configured to perform the functions and operations associated with the above-disclosed methods. In accordance with yet another embodiment, a computer program product comprising a computer usable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

The present disclosure is directed to systems and corresponding methods that facilitate communication in a computing environment.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
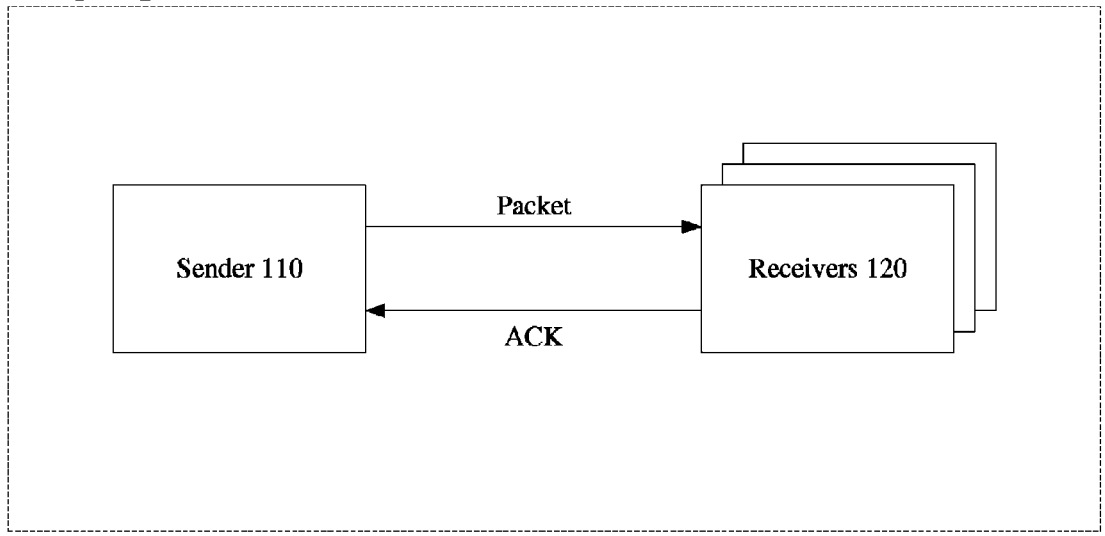
FIG. 1 illustrates an exemplary computing environment, in accordance with one embodiment.

Referring to FIG. 1, in accordance with one embodiment, an exemplary computing environment 100 comprises one or more computing systems. The computing systems include sender 110 and one or more receivers 120.

Figure 2:
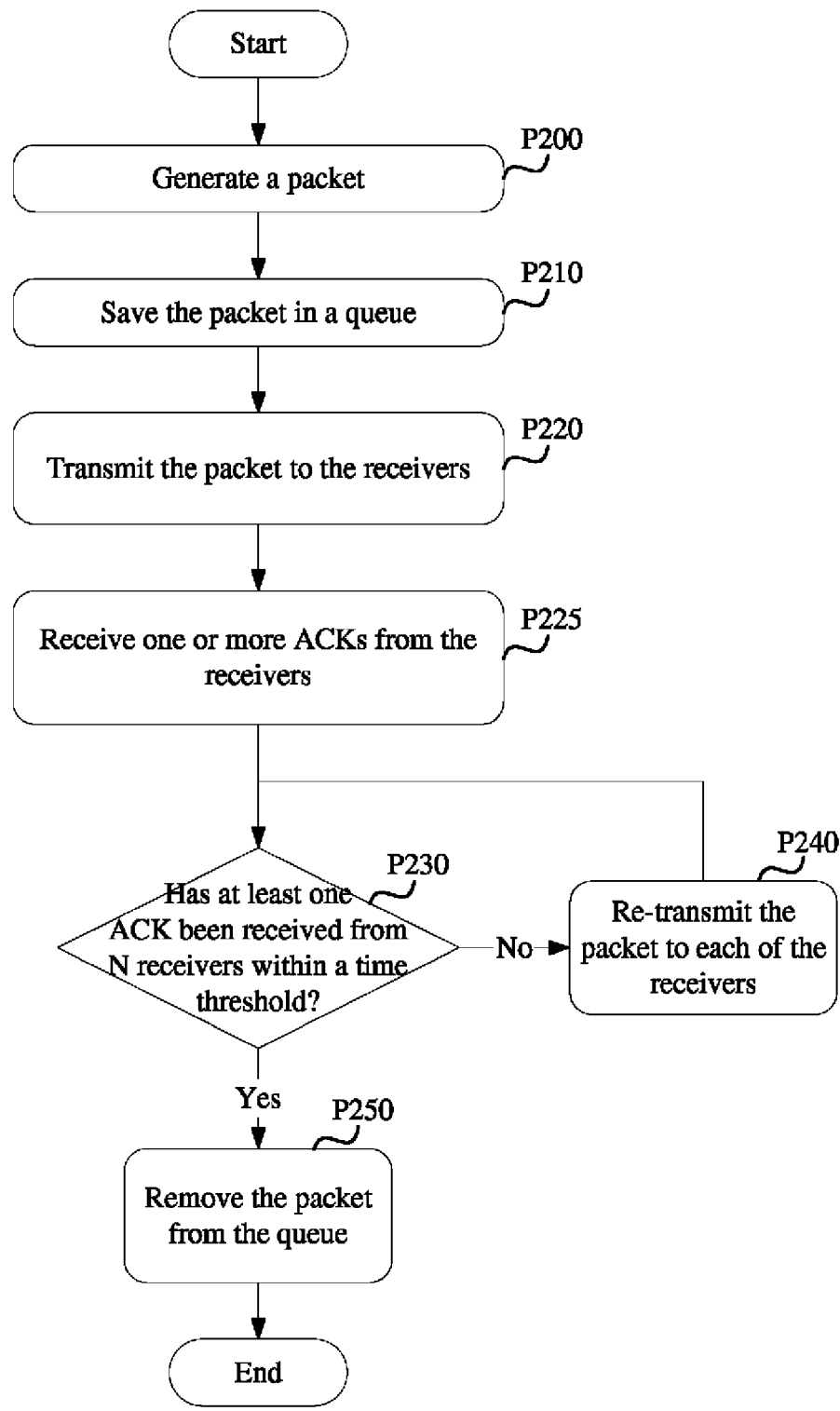
FIG. 2 is a flow diagram of a method for communication in a computing environment, in accordance with one embodiment.

As illustrated in FIGS. 1 and 2, in accordance with one embodiment, sender 110 communicates with receivers 120 by generating a packet (P200), saving the packet in a queue (P210), and transmitting the packet to each of the receivers 120 (P220). Upon transmitting the packet, sender 110 receives one or more ACKs from receivers 120 (P225).

If at least one ACK is not received from n receivers 120 within a time threshold, sender 110 retrieves the packet from the queue and re-transmits the packet to each of the receivers 120 (P240). n is a positive integer value indicating the minimum number of different receivers 120 from which sender 110 receives an ACK before removing the packet from the queue. Sender 110 may dynamically change the value of n based on the status of ACKs that have already been received.

If at least one ACK is received from n receivers 120 within the time threshold (P230), sender 110 removes the packet from the queue (P250). Because n is a minimum value, sender 110 may retain the packet in the queue even after n ACKs have been received or after the threshold time. In one embodiment, sender 110 may, for example, re-transmit the packet to the receivers 120 from which a NAK is received and remove the packet according to a cleaning mechanism (e.g., based on memory consumption).

Depending on implementation, a receiver 120 may, for example, send identification information along with an ACK so that sender 110 may easily distinguish between the n receivers 120. However, if n is equal to one, identification is unnecessary because sender 110 does not have to distinguish between receivers 120.

In an alternative embodiment, each ACK received from a receiver 120 is assigned a weight, and sender 110 removes a packet from the queue (P250) if the combined weight of ACKs received from receivers 120 within a time threshold is greater than a certain threshold weight. For example, if the set of receivers includes two types of receivers (e.g., reliable and semi-reliable), the system may be configured so that a packet is at least received by one reliable receiver or two semi-reliable receivers. In such an implementation, the reliable receivers may be assigned a weight of 1 and the semi-reliable receivers may be assigned a weight of 0.5, for example. The sender may accumulate the received ACKs from the different types of receivers for a packet and sum the assigned weights for each. Accordingly, once the total weight has reached a predetermined threshold for a packet, then that packet is removed from the queue.

In some embodiments, sender 110 tracks the number of packets for which at least one ACK is not received from n receivers 120 within the threshold time. When the number (of packets which have not yet been ACKed) reaches a certain threshold, sender 110 suspends generation of new packets and retains the data packets without sufficient ACKs in the queue. Thus, no packets are lost if there is a problem that prevents all or some of the receivers 120 from receiving packets (e.g., due to failed receivers). Once the problem is resolved, sender 110 continues to generate packets.

Sender 110 may also control the number of ACKs that are sent by receivers 120 so that but a limited number of ACKs are sent to sender 110. In one embodiment, a subset of receivers selected from among receivers 120 send ACKs to sender 110; receivers that are not selected do not send ACKs to sender 110. Sender 110 may change the number of ACKs sent by adding or removing receivers from the subset based on the number of received ACKs. Sender 110 may determine whether a selected receiver is sending ACKs reliably. If the selected receiver is not sending ACKs reliably, sender 110 replaces the receiver with another receiver or simply adds another receiver to the subset.

In another embodiment, sender 110 publishes an ACK send probability p to receivers 120 so that when a receiver 120 generates an ACK, there is a p probability that the ACK is sent to sender 110 and a 1-p probability that the ACK is not sent. For example, if sender 110 publishes an ACK send probability of 0.25 and a receiver 120 generates an ACK, there is a 0.25 probability, or 25% chance, that the ACK is sent to sender 110 and a 0.75 probability, or a 75% chance, that the ACK is not sent.

Sender 110 may change the value of p based on the number of ACKs received from receivers 120. For example, if the number of ACKs received is greater than a certain threshold, sender 110 may decrease the value of p so that fewer ACKs are sent. If the number of ACKS received is less than a certain threshold, sender 110 may increase the value of p so that more ACKs are sent.

Advantageously, the systems and methods provided herein avoid the problems associated existing ACK-based protocols because sender 110 is not required to identify the receiver set. Instead, sender 110 merely determines whether n receivers have sent at least one ACK, each ACK confirming the receipt of a data packet. Receivers 120 in the receiver set may send identification information along with an ACK so that sender 110 can easily distinguish different receivers 120. Also, by changing the value of n, sender 110 may dynamically increase or decrease the number of receivers 120 in the receiver set to control transmission bandwidth and efficiency.

According to the identification information, sender 110 may determine that a receiver 120 has failed or is otherwise unable to receive a packet. In such a case, sender 110 may suspend re-transmission of packets in the queue to the particular receiver 120. As such, additional delay and unnecessary re-transmissions are avoided. Further, sender 110 may suspend transmission of new packets to the receiver 120 so that the number of undelivered packets in the queue and thus memory consumption for maintaining the undelivered packets in the queue is reduced. Once it is determined that receiver 120 is able to receive packets again, sender 110 may resume transmission of packets to the receiver 120.

Depending on implementation and network traffic or bandwidth, sender 110 may dictate the number of ACKs or the number of receivers 120 that are to generate ACKs. A reduction in the number of generated ACKs improves efficiency. In contrast, an increase in the number of ACKs provides improved transmission reliability. Accordingly, in one embodiment, to improve efficiency, sender 110 may limit number of ACKs transmitted by each receiver 120 or limit the number of receivers that are to generate an ACK to a select subset of receivers 120, for example.

Sender 110 may further improve network efficiency by removing one or more receivers 120 from a selected subset, so that even fewer ACKs are sent. The removal of the receivers 120 from the selected subset may take place dynamically based on the sender's 110 monitoring of the network conditions. As such, sender 110 may also attempt to improve transmission reliability by adding one or more receivers 120 to the selected subset, so that more receivers 120 are required to transmit ACKs in response to receiving a packet.

In another embodiment, sender 110 may publish an ACK send probability p to receivers 120 so that a receiver 120 generates an ACK according to probability p so that the ACK is sent to sender 110 if that probability is satisfied. Sender 110 may improve network efficiency by decreasing the value of p so that fewer ACKs are sent. Sender 110 may improve transmission reliability by increasing the value of p so that more ACKs are sent.

The disclosed systems and methods provide a higher level of reliability than NAK-based protocols because sender 110 does not remove a packet from the queue until sender 110 has received at least one ACK from n receivers 120. Depending on implementation, sender 110 may keep a packet in the queue even after receiving at least one ACK from n receivers 120, for example, until a cleaning mechanism removes the packet from the queue.

While one or more embodiments have been disclosed in association with a standard ACK-based protocol, it is noteworthy that the concepts and principles disclosed herein are also applicable to any multicasting protocol whether ACK or NAK-based and having any type of modifications (e.g., allowing receivers to send NAKs for faster recovery, using ACK trees to limit the amount of ACKS that are sent to the sender, adaptive control over the rate of ACKs sent, and other modifications) without limitation.

In different embodiments, the invention may be implemented either entirely in the form of hardware or entirely in the form of software, or a combination of both hardware and software elements. For example, computing environment 100 can be presented largely in terms of hardware components and software code executed to perform processes that achieve the results contemplated by the system of the present invention.

Figure 3:
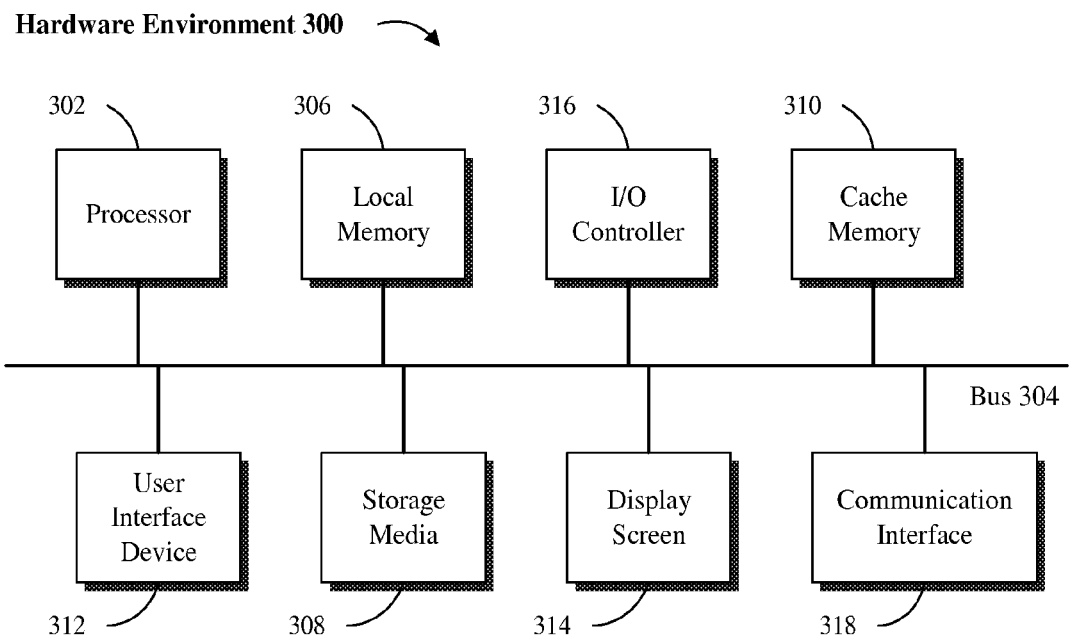
FIGS. 3 and 4 are block diagrams of hardware and software environments in which a system of the present invention may operate, in accordance with one or more embodiments.
Figure 4:
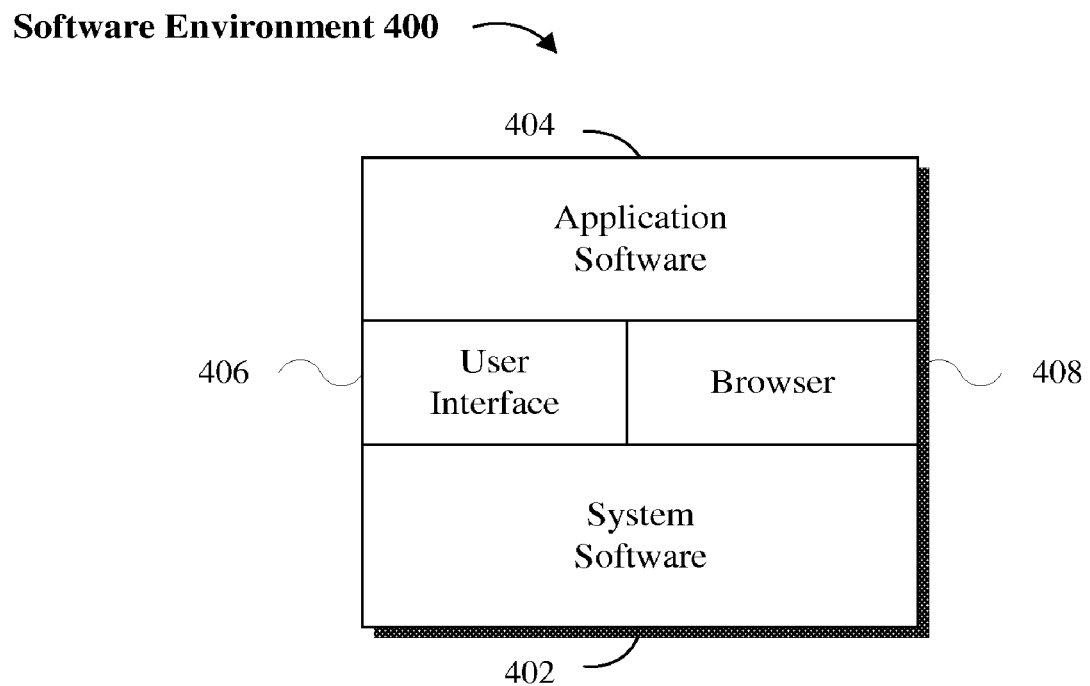

Referring to FIGS. 1, 3, and 4, in accordance with an exemplary embodiment, computing environment 100 is composed of a hardware environment 300 and a software environment 400. The hardware environment 300 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 400 is divided into two major classes comprising system software 402 and application software 404. System software 402 comprises control programs, such as the operating system (OS) and information management systems that instruct the hardware how to function and process information.

In one embodiment, system software 402 or application software 404 may be implemented and executed on one or more hardware environments to facilitate communication between sender 110 and receivers 120 in computing environment 100. Application software 404 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIGS. 3 and 4, an embodiment of the system software 402 and application software 404 may be implemented as computer software in the form of computer readable code executed on a data processing system such as hardware environment 300 that comprises a processor 302 coupled to one or more computer readable media or memory elements by way of a system bus 304. The computer readable media or the memory elements, for example, may comprise local memory 306, storage media 308, and cache memory 310. Processor 302 loads executable code from storage media 308 to local memory 306. Cache memory 310 provides temporary storage to reduce the number of times code is loaded from storage media 408 for execution.

A user interface device 312 (e.g., keyboard, pointing device, etc.) and a display screen 314 may be coupled to the computing system either directly or through an intervening I/O controller 316, for example. A communication interface unit 318, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 300 may not include all the above components, or may comprise other components for additional functionality or utility. For example, hardware environment 300 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 318 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIGS. 1, 3, and 4, system software 402 and application software 404 may comprise one or more computer programs that are executed on top of an operating system after being loaded from storage media 408 into local memory 306. In a client-server architecture, application software 404 may comprise client software and server software. For example, in one embodiment of the invention, client software is executed on receivers 120 and server software is executed on sender 110.

Software environment 400 may also comprise browser software 408 for accessing data available over local or remote computing networks. Further, software environment 400 may comprise a user interface 406 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for communication in a computing environment, the method comprising:
    transmitting a first data packet in a send queue to a plurality of receiving units in a first set;
    receiving one or more acknowledgement messages (ACKs) from one or more of the plurality of receiving units in a second set, wherein the second set is a subset of the first set;
    removing the first data packet from the send queue, in response to receiving at least one ACK from N receiving units from the plurality of receiving units within a time threshold;
    re-transmitting the first data packet from the send queue to the plurality of receiving units in the first set, in response to failing to receive at least one ACK from the N receiving units within the time threshold; and
    controlling number of ACKs sent by the plurality of receiving units in the first set to increase network reliability by:
        adding one or more receiving units to the second set, in response to receiving less than a threshold number of ACKs from said N receiving units in said time threshold; or
        replacing one or more receiving units in the second set, in response to determining that the receiving units do not meet a reliability threshold.

2. The method of claim 1, further comprising dynamically changing the value of N based on number of ACKs received from one or more of the plurality of receiving units in the second set to control transmission bandwidth and efficiency.

3. The method of claim 1, further comprising re-transmitting the first data packet to a receiving unit in the first set, in response to receiving a negative acknowledgment message (NAK) from the receiving unit.

4. The method of claim 1, further comprising suspending generation of new packets, in response to determining that there are more than a threshold number of packets in the queue.

5. The method of claim 1, wherein the second set is identical to the first set.

6. The method of claim 1, further comprising receiving identification information along with ACKs from the second set.

7. The method of claim 1, further comprising controlling number of ACKs sent by the first set to increase network efficiency by removing a receiving unit from the second set, in response to receiving more than a threshold number of ACKs.

8. The method of claim 1, further comprising controlling number of ACKs sent by the first set by publishing a probability to the first set so that the likelihood that a receiving unit in the first set will send an ACK is based on the probability.

9. The method of claim 8, further comprising:
    increasing the probability, in response to receiving less than a threshold number of ACKs; and
    decreasing the probability, in response to receiving more than a threshold number of ACKs.

10. A computer program product comprising a non-transitory data storage medium having logic code embedded thereon, wherein the execution of the logic code on a computer causes the computer to:
    transmit a first data packet in a send queue to a plurality of receiving units in a first set;
    receive one or more acknowledgement messages (ACKs) from one or more of the plurality of receiving units in a second set, wherein the second set is a subset of the first set;
    remove the first data packet from the send queue, in response to receiving at least one ACK from N receiving units from the plurality of receiving units within a time threshold;
    re-transmit the first data packet from the send queue to the plurality of receiving units in the first set, in response to failing to receive at least one ACK from the N receiving units within the time threshold; and
    control number of ACKs sent by the plurality of receiving units in the first set to increase network reliability by:
        adding one or more receiving units to the second set, in response to receiving less than a threshold number of ACKs from said N receiving units in said time threshold; or
        replacing one or more receiving units in the second set, in response to determining that the receiving units do not meet a reliability threshold.

11. A system comprising: one or more processors in communication with one or more data storage mediums, including a send queue, for monitoring efficient multicasting in a communication network comprising a plurality of sending and receiving units;
- a logic unit for transmitting a first data packet in a send queue to a plurality of receiving units in a first set;
- a logic unit for receiving one or more acknowledgement messages (ACKs) from one or more of the plurality of receiving units in a second set, wherein the second set is a subset of the first set;
- a logic unit for removing the first data packet from the send queue, in response to receiving at least one ACK from N receiving units from the plurality of receiving units within a time threshold;
- a logic unit for re-transmitting the first data packet from the send queue to the plurality of receiving units in the first set, in response to failing to receive at least one ACK from the N receiving units within the time threshold; and
- a logic unit for controlling number of ACKs sent by the plurality of receiving units in the first set to increase network reliability by: adding one or more receiving units to the second set, in response to receiving less than a threshold number of ACKs from said N receiving units in said time threshold; or replacing one or more receiving units in the second set, in response to determining that the receiving units do not meet a reliability threshold.

12. The system of claim 11, further comprising a logic unit for dynamically changing the value of N to control transmission bandwidth and efficiency.

13. The system of claim 11, further comprising a logic unit for re transmitting the first data packet to a receiving unit in the first set, in response to receiving a negative acknowledgment message (NAK) from the receiving unit.

14. The system of claim 11, further comprising a logic unit for suspending generation of new packets, in response to determining that there are more than a threshold number of packets in the queue.

15. The system of claim 11, wherein the second set is identical to the first set.

16. The system of claim 11, further comprising a logic unit for receiving identification information along with ACKs from the second set.

17. The system of claim 11, further comprising a logic unit for controlling number of ACKs sent by the first set by publishing a probability to the first set so that the likelihood that a receiving unit in the first set will send an ACK is based on the probability.

18. The system of claim 17, further comprising:
- a logic unit for increasing wherein the probability, in response to receiving less than a threshold number of ACKs; and
- a logic unit for decreasing the probability, in response to receiving more than a threshold number of ACKs.

* * * * *